C. T. COCHRAN.
SIGNAL.
APPLICATION FILED JULY 14, 1919.

1,347,011.

Patented July 20, 1920.
2 SHEETS—SHEET 1.

INVENTOR.
Carl T. Cochran
BY
Hardway & Cathey
ATTORNEYS.

C. T. COCHRAN.
SIGNAL.
APPLICATION FILED JULY 14, 1919.
1,347,011.
Patented July 20, 1920.
2 SHEETS—SHEET 2.
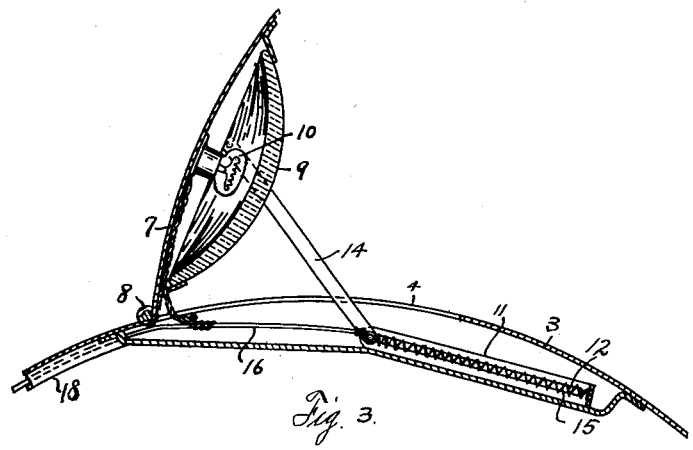
Fig. 3.
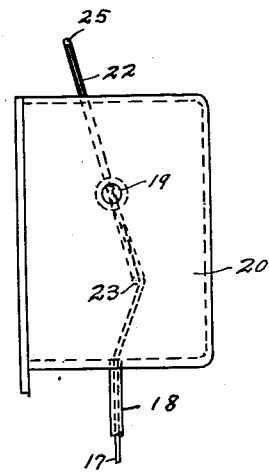
Fig. 6.
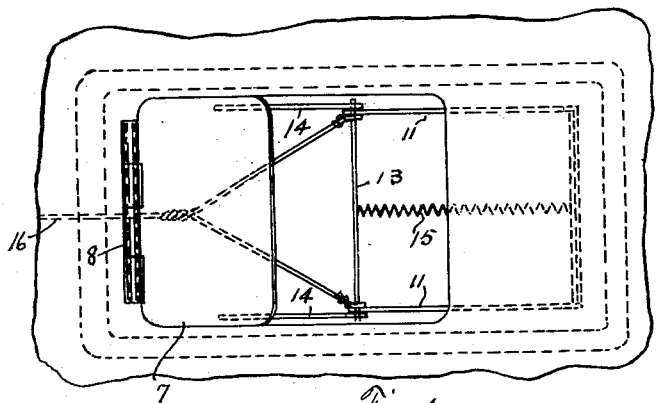
Fig. 4.
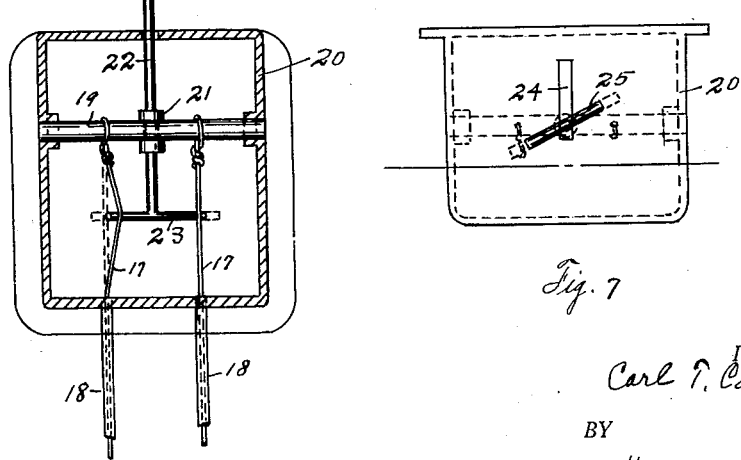
Fig. 5.
Fig. 7
INVENTOR.
Carl T. Cochran,
BY
Hardway & Cathy
ATTORNEY.S.

UNITED STATES PATENT OFFICE.

CARL T. COCHRAN, OF HOUSTON, TEXAS.

SIGNAL.

1,347,011.         Specification of Letters Patent.      Patented July 20, 1920.

Application filed July 14, 1919. Serial No. 310,703.

*To all whom it may concern:*

Be it known that I, CARL T. COCHRAN, a citizen of the United States, residing at Houston, in the county of Harris and State of Texas, have invented certain new and useful Improvements in Signals, of which the following is a specification.

This invention relates to new and useful improvements in a signal.

One object of the invention is to provide a signal device of the character described, which is specially adapted to be mounted upon the fenders of a motor vehicle, and is arranged to be manipulated so as to indicate the direction of the intended movement of the vehicle.

Another object of the invention is to provide a signal device of the character described which may be manipulated so as to signal other vehicles in the front or in the rear, and to give them warning of the intended movement or stoppage of the vehicle whereon the signal is mounted.

A further feature of the invention is to provide a signal device of the character described which is adapted to be used either in the daytime or at night, which is neat and compact in its structure, and which will not detract from the appearance of the vehicle.

With the above and other objects in view, the invention has particular relation to certain novel features of construction, operation and arrangement of parts, an example of which is given in this specification and illustrated in the accompanying drawings, wherein:

Fig. 3, is an enlarged fragmentary sectional view of one of the vehicle fenders showing the device mounted thereon.

Fig. 4, is a fragmentary plan view thereof.

Fig. 5, is a sectional view of the signal controlling mechanism.

Fig. 6, is a side view thereof, and

Fig. 7, is a plan view thereof.

Figure 1:
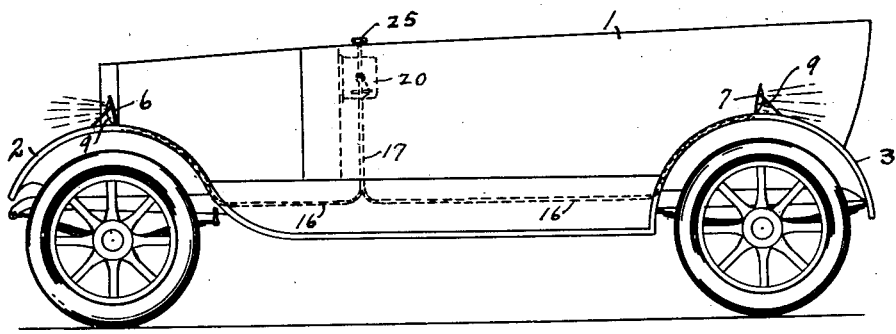
Figure 1, is a side view of an automobile, showing the signal device mounted thereon.
Figure 2:
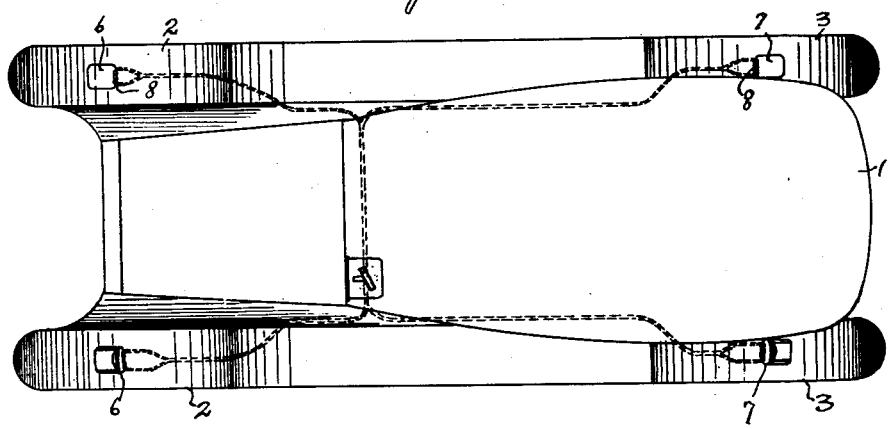
Fig. 2, is a plan view thereof.

Referring now more particularly to the drawings wherein like numerals of reference designate similar parts in each of the figures, the numeral 1, refers to an automobile, having the front fenders 2, 2, and the rear fenders 3, 3. Each fender has a hole 4, cut through the top thereof, and underneath said holes and secured in spaced relation to the underside of the fender are the aprons 5. Hinged to the front fenders are the metallic plates 6, and to the rear fenders, there are hinged similar plates 7, said plates being connected to the fenders by suitable hinges 8, and when the signal device is at rest, the plates 6 and 7 fit down upon the fenders closing the openings 4, and giving a finished appearance to said fenders. The underside of each plate has a concavo-convex lens 9, secured thereto, inclosing an electric globe 10, said lens being of some suitable color, preferably red, so as to be conspicuous in the day time and to give a colored light at night. Fixed to each apron 5, and spaced apart, there are the tracks 11, 11, having oblong slots as 12, extending approximately from end to end thereof, in which the ends of the rods 13 have sliding bearings, and the links 14, 14, are pivoted at one end to the corresponding covering, and at their other ends to the rod 13. A strong pull spring 15 is attached at one end to the apron 5, and at its other end to the corresponding rod 13, and these pull springs normally operate to hold the coverings 6 and 7 in closed position, the lenses 9, then occupying the space between the coverings and the aprons 5 underneath. Attached to each rod 13, there is a wire or cord 16, said wires on each side uniting into a common wire 17, and said wires preferably operating through tubing 18. The ends of the wires 17 are tied to a transverse shaft 19, which is mounted in the casing 20, preferably carried by the dash board of the vehicle, and within easy reach of the operator. The shaft 19 has a vertical bearing 21 in which the manual rod 22 has a bearing, and the lower end of this rod has a cross arm 23 adapted to be brought into engagement with either of the wires 17, depending upon which way the rod 22 is turned. The upper end of this rod 22 extends through an oblong slot 24, in the upper side of the casing 20, and has the hand grip 25, fixed thereon through which the rod may be manipulated. When it is desired to lift the signals on either side of the car, the manual rod 22 may be turned correspondingly and will engage against and exert a pull on the desired wire 17, which, in turn, will exert a pull upon the corresponding wires 16, 16, and the corresponding rods 13, and this will operate through the corresponding links 14 to lift the desired signals, both in front and rear, thus indicating the direction in which it is intended to turn the car. In order to lift all of the signals, the manual rod 22 may be forced forwardly, moving in the slot 24, and the cross arm 23 will then exert a pull on both of the wires 17 and thus lift all of the signals indicating that it is intended to stop the car.

What I claim is:

1. A signal device for motor vehicles, including wheel fenders provided with recesses, plates hinged to said fenders, translucid concavo-convex lenses secured to said plates, electric lights carried by the plates and inclosed by said lenses, said lenses being inclosed by said plates in said recesses, when the plates are lowered into contact with the fenders and means for lifting and lowering said plates.

2. A signal device for motor vehicles, including signal members hinged to the respective fenders, of the vehicle, and normally resting on said fenders, lenses carried by the respective members and inclosing electric lights, said fenders being provided with recesses which receive and protect said lenses when the signal members are in inactive position, and a manual device operatively connected to said signal members whereby said members on one side of the vehicle, may be lifted independently of those on the other side, said manual device also being arranged to lift all of said signal members simultaneously.

In testimony whereof I have signed my name to this specification in the presence of two subscribing witnesses.

CARL T. COCHRAN.

Witnesses:
 WM. A. CATHEY,
 IRENE I. BRUNS.